Figure 3:
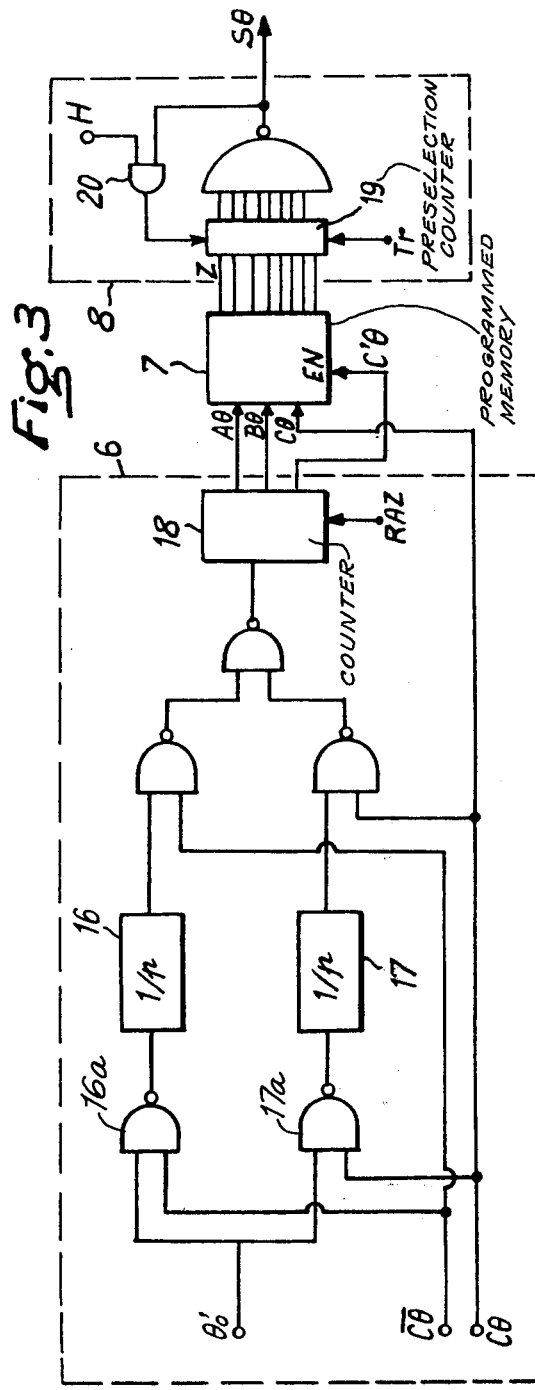

United States Patent [19]
Monpetit

[11] 4,034,719
[45] July 12, 1977

[54] CONTROL METHOD AND APPARATUS FOR COMBUSTION MOTORS

[75] Inventor: Louis Monpetit, L'Etang-la-Ville, France

[73] Assignee: Societe des Procedes Modernes d'Injection Sopromi, Clichy, France

[21] Appl. No.: 529,915

[22] Filed: Dec. 5, 1974

[30] Foreign Application Priority Data

Dec. 7, 1973  France ............................. 73.43751

[51] Int. Cl.² .......................................... F02B 3/00
[52] U.S. Cl. ............................................. 123/32 EB
[58] Field of Search ............... 123/32 EA; 235/154, 235/150.2, 150.21

[56] References Cited

U.S. PATENT DOCUMENTS

| | | |
|---|---|---|
| 3,165,730 | 1/1965 | Robinson ...................... 123/32 EA |
| 3,689,753 | 9/1972 | Williams et al. .............. 123/32 EA |
| 3,689,755 | 9/1972 | Hodgson et al. .............. 123/32 EA |
| 3,699,325 | 10/1972 | Montgomery ...................... 235/154 |
| 3,821,696 | 6/1974 | Harrell .............................. 235/154 |
| 3,831,563 | 8/1974 | Brittain et al. ................. 123/32 EA |
| 3,838,397 | 9/1974 | Watson et al. ................. 123/32 EA |

Primary Examiner—Ronald B. Cox
Attorney, Agent, or Firm—Darby & Darby

[57] ABSTRACT

Apparatus and method for producing a control signal for a fuel injection system of a combustion motor wherein operating parameters of the motor are measured in analog form and alternately converted into digital information, the digital information is counted and applied to produce coded words each corresponding to an operating parameter, the coded words are applied to a programmed memory to produce output words and the output words are converted into the control signal.

5 Claims, 4 Drawing Figures

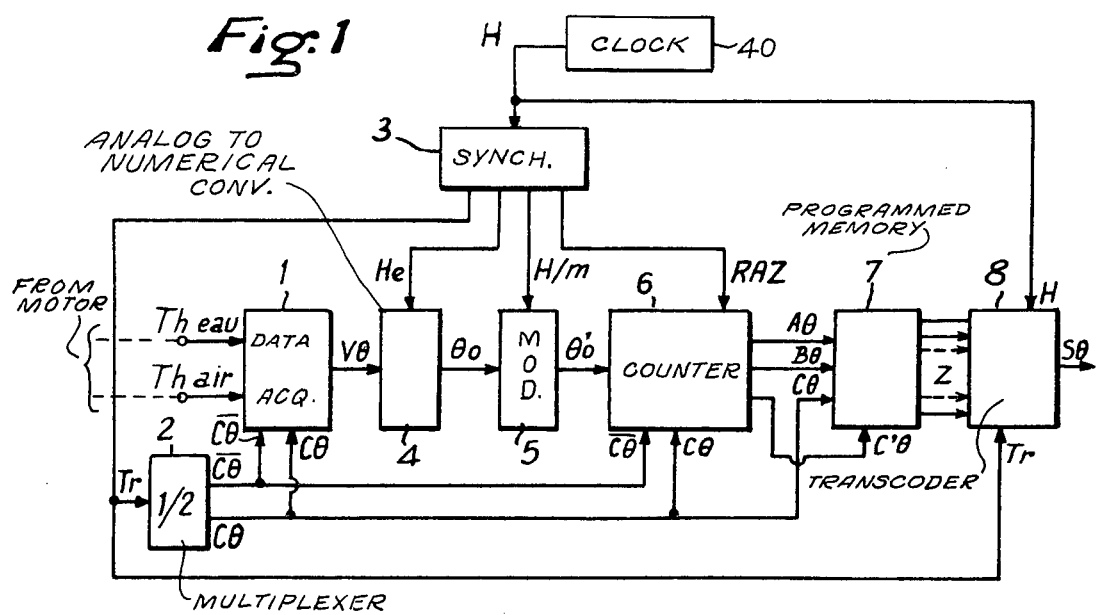
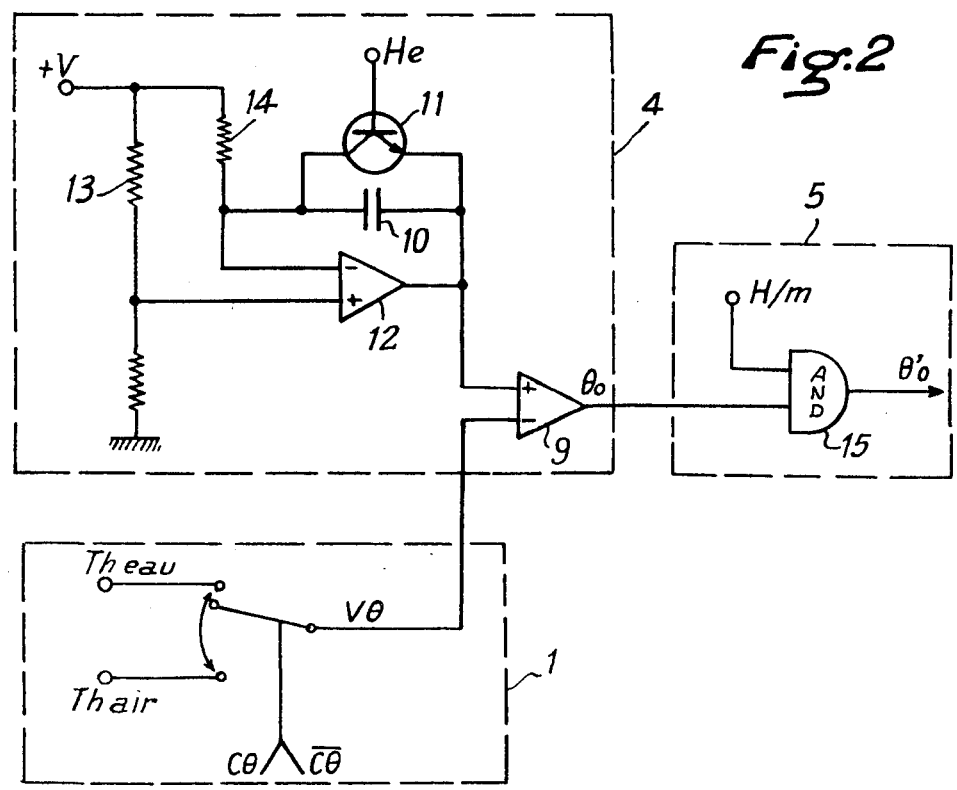

CONTROL METHOD AND APPARATUS FOR COMBUSTION MOTORS

The invention relates to a control method and apparatus for an internal combustion motor, in particular one for use for automotive vehicles.

My prior U.S. patent application Ser. No. 422,061, filed Dec. 5, 1973 (French patent application No. 72 43329) describes a method and apparatus of control for a combustion motor in which the data in analog form, furnished by pickups measuring physical quantities of the working parameters of the motor, are coded in the form of a first numerical word. This is converted by a programmed memory into a second word and is transformed into a linear function for regulating the operation of the motor. This permits, for example, an adjustment of the fuel injection time. The foregoing process and apparatus makes it possible to obtain an $n$ dimensional regulatory function, depending on the $n$ physical quantities measured.

It is also possible to process several parameters having only a corrective influence on the regulating function in a more economical manner. For example, in my U.S. patent applications Ser. No. 493,912, filed Aug. 1, 1974 and Ser. No. 500,907, filed Aug. 27, 1974 (these corresponding respectively to French Patent No. 73 28442 of Aug. 3, 1973 and Certificate of Addition thereto No. 73 31027 of Aug. 28, 1973), there is described a correction circuit which receives, as a signal representative of physical quantities or parameters, a signal with variable cyclic ratio.

The object of the present invention is the processing of data furnished by pickups of parameters of the motor, and their transformation into a signal with a variable cyclic ratio. The invention includes an apparatus and method of control for a combustion motor in which a regulatory function is corrected by the action of a signal with variable cyclic ratio which is produced by sampling the engine operating parameters. The regulating function is produced by a computer which is used to control a fuel injection system.

In the present invention the signal of variable cyclic ratio is a function of parameters of the motor. It is produced by taking signals representative of the motor operating parameters and alternately applying them to a device for conversion into a variable cyclic ratio modulated by a clock signal. The modulated, variable cyclic ratio signal is alternately applied to counters where the frequency is divided proper to each parameter, and the remainders are retained. The output signals from the counters are alternately applied to a common numerical coding device. The coded signal and the signal governing the alternations are applied as an input signal to a programmed memory which produce an output signal which is alternately a function of each parameter.

According to one characteristic of the invention, the analog signals representative of the parameters are processed by multiplexing. According to another characteristic of the invention, the input signal of the memory is constituted by the lower weight bits of the coded signals, and by the signal governing the alternations. The highest weight bit of the coded signal is applied to the reading validation input of the programmed memory.

By way of example, there is shown, in the drawings:

In FIG. 1, a general block diagram of the control apparatus for a combustion motor using two engine parameters.

In FIG. 2, a circuit diagram of the elements in the circuit of FIG. 1 for insuring the production of the variable cyclic ratio modulated by the clock signal.

In FIG. 3, a circuit diagram of the other elements of the circuit of FIG. 1 for insuring the coding and production of the variable cyclic ratio.

Figure 4:
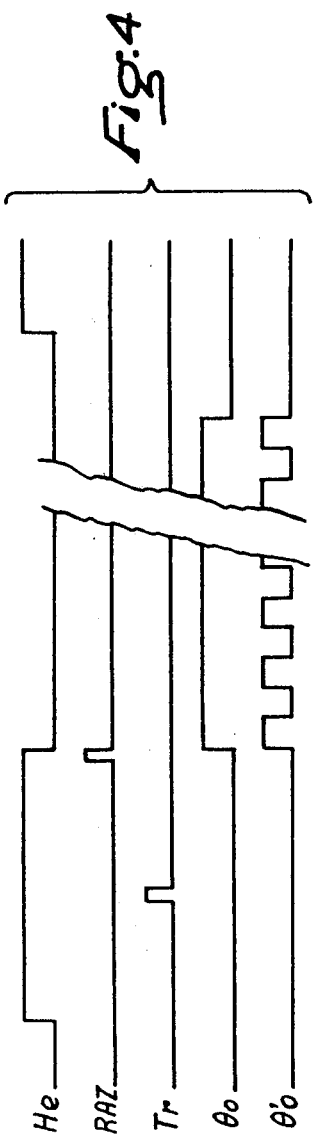

In FIG. 4, a representation of different signals produced by the circuit of FIG. 1.

In the example of the invention described, two engine operating parameters are used, here illustratively the temperature of the water in the motor (or in the head), and the temperature of the air.

The analog signals representative of these parameters, $Th_{water}$ and $Th_{air}$, respectively, come from two temperature probes, for example, thermistors or other similar transducer elements. These signals are applied to a data acquisition circuit 1, described in greater detail below which delivers an anlog signal of voltage $V\theta$, representing, alternately, the temperature of the engine water and that of the air. The alternation is produced by means of two multiplexing signals $C\theta$ and $\overline{C\theta}$ from a multiplexing circuit 2, which divides by 2. Circuit 2 is supplied a transfer signal Tr from a synchronizer 3 to cause the multiplexing. Synchronizer 3 is a timing circuit containing a master clock and other necessary dividers, pulse forming circuits, etc. needed to produce a variety of timing signals which are described hereafter. Since such synchronizing circuits are well-known in the art, and the details thereof specifically form no part of the subject invention, they are not described in detail.

An analog-numerical, converter 4, which is described in detail in FIG. 2, is controlled by a signal He from the synchronizer 3. Circuit 4 converts the analog signal $V\theta$ into a cyclic ratio signal $\theta o$. The $\theta o$ signal is a rectangular type pulse of variable duration within a fixed period. The duration of the pulse within the period corresponds to the amplitude of the input analog signal. The $\theta o$ signal is produced at a fixed cadencing, or sampling, frequency synchronized by a signal He from synchronizer 3. The $\theta o$ signal alternately is representative of the amplitude of the $Th_{air}$ and $Th_{water}$ signals. The term variable cyclic into signal therefore describes the ratio of the Go signal to the fixed period.

The cyclic ratio signal $\theta o$ is modulated by a clock signal of frequency H/m in a modulation circuit 5, also described in FIG. 2, which delivers a signal $\theta'o$. The $\theta'o$ signal is a series of pulses which are to be counted. The number of pulses is determined by the duration of the $\theta o$ pulse which itself is a function of the magnitude of the analog input signals. Thus, circuits 4 and 5 in combination function as an analog-digital converter.

A counting unit 6 transforms the $\theta'o$ signal into a word segment of three bits, $A\theta$, $B\theta$ and $C'\theta$, the third being a range overstep bit applied directly to the reading validation input of a programmed memory 7. The counter and memory are described in greater detail in FIG. 3.

The three numerical signals $A\theta$, $B\theta$, $C'\theta$ and the $C\theta$ signal from circuit 2 constitute addresses for a programmed memory 7, which matches each address in memory and produces an eight-bit output word Z1, Z2 ... Z8. The output word alternates in accordance with the alternation of the original analog input data.

The output word of memory 7 is applied to a transcoder 8 where it is gated by a signal of fixed frequency H to produce the final output signal $S\theta$. The output signal $S\theta$ of transcoder 8 is applied to a working circuit (not shown). This can be, for example, a computer used to control fuel injection time and/or duration for a motor. Here, $S\theta$ can be used to insure, for example, the determination of the fuel injection time by division of clock frequency signals H according to a numerical law depending on the signal $S\theta$. Such a working circuit has been described in my aforesaid United States patent application Ser. Nos. 493,912 and 500,907.

Synchronizer 3 receives the clock signals H from a suitable source 40 and produces the signals Tr for driving the multiplex circuit 2, the signals He for the analog-digital converter 4, the signals H/m for the modulator 5 and the zero reset signals RAZ for the counter. As described above, the synchronizer circuits for producing these signals are conventional.

Referring to FIG. 2 there is shown at 1 the data acquisition circuit for alternately transmitting the two analog signals $Th_{water}$ and $Th_{air}$ under the control of the complementary multiplexing signals $C\theta$ and $\overline{C\theta}$ from multiplexing circuit 2. The latter two signals are produced by any suitable switching circuit, for example, a multivibrator which is triggered by the Tr signals from synchronizer 3. The multiplexed analog signal $V\theta$ is applied to the complementary input of a comparator 9 (operational amplifier) which is part of the analog-numerical converter 4. Comparator 9 receives at its other input the output signal Vs of a sawtooth generator formed in part by an operational amplifier 12 whose two inputs are fed from a supply voltage source +V by resistors 13 and 14.

The sawtooth generator includes a capacitor 10 which shunts amplifier 12 and a transistor 11 connected in parallel with the capacitor 10 to control the discharge of the capacitor. The base of transistor 11 receives in each sampling period a positive signal He (line a of FIG. 4) from the synchronizer 3 which makes transistor 11 conduct to saturation. This causes short-circuiting of capacitor 10 and the voltage Vs remains constant.

During the period when transistor 11 is blocked, when He is low, capacitor 10 is charging from the voltage source and the output voltage Vs is a linear function of the time in the form $$Vs = V(a - bt).$$

The value of resistor 13 is adjusted to define $a$, and that of resistor 14 to define $b$.

The voltage Vs is compared with $V\theta$ by operational amplifier 9, the point of intersection being defined by:

$$V\theta = V f(\theta) = Vs = V(a - bt)$$

$$f(\theta) = a - bt$$

and $$t = \frac{a - f(\theta)}{b}$$

which defines the cyclic ratio of conversion. In the course of a sampling, the signal $\theta o$ is high as long as Vs is greater than $V\theta$ (see line d of FIG. 4).

The comparator output signal $\theta o$ is applied to modulator 5 which includes a gate 15 which likewise receives a signal of frequency H/m from synchronizer 3. When $\theta o$ is high, the pulses of frequency H/m can pass through gate 15 as output signal $\theta o$ to counter 6. These pulse constitute the $\theta'o$ signal, as shown on line e of FIG. 4, and they are applied to counter 6 (FIG. 3).

In the course of a sampling cycle, the measuring time is limited to the fraction of the cycle during which He is low, that is while capacitor 10 is charging and Vs is greater than $\theta o$. This eliminates the risk of spurious contings caused by the zero reset of the sawtooth generator of the analog-numerical converter 4. As seen in FIG. 3 the $\theta'o$ signal produced when comparator 9 is high and the gate 15 of modulator 5 is open is applied to one input of each of gates 16a and 17a which precede respectively connected counters 16 and 17. When signal $C\theta$ from multiplex circuit 2 is high it opens gate 17a to counter 17 (air temperature). When $C\theta$ is low, signal $\overline{C\theta}$ is high and it opens the counting gate 16a to counter 16 (water temperature).

The numbers of H/m pulses passing gate 15, corresponding to the time cyclic ratio signal $\theta o$ is high, are counted, after division by a factor $p$ in each of counters 16 or 17, by a three-bit counter 18 (FIG. 3). At the end of each sampling, the outputs $A\theta$, $B\theta$, $C'\theta$, represent the coding of the parameters, that is to say, in this example, of the temperature of the air or water.

The temperture is normally expressed by a two-bit number ($A\theta$, $B\theta$). The bit $C'\theta$ becomes high only if the temperature is higher than the limit of the controlled range. The coding counter 18 is reset to zero by signal RAZ from synchronizer 3 (See line b of FIG. 4). It should be noted that at the moment of the appearance of the singal Tr at multiplexing circuit 2, the coding counters of counter 6 are in a state significant of the measurement just made, but cannot change state inasmuch as He is high (see FIG. 4).

The circuit 6 in FIG. 3 therefore produces two bits of value $A\theta$ and $B\theta$ for the temperatures of the air and water alternately, and an overstep bit $C'\theta$.

This circuit also gives rise to the input interpolation, that is to say that the segments of words which it produces are such that after a certain number of samplings (calculation cadencing), the mean value of each word segment will correspond, for the related temperature (air or water), to the exact value of this temperature.

As a matter of fact, counters 16 and 17 are never reset to zero. At the time of each sampling, the coding by counter 18 therefore indicates an approximate value, the remainders being accumulated. Over a series of samplings, the mean value of each temperature is representative, the relative error of the means value being very small, on the order of 1 percent.

When the temperature range is overstepped, bit $C'\theta$ becomes high. If this is in interpolation, the temperature (air or water) is closed to the temperature above which no further alteration of the calculation is made. If it is permanent, the maximum temperature of intervention is exceeded.

In FIG. 3, it is seen that the word segments produced by the processing unit 6 are addressed to the programmed memory 7. A complete address in this memory is constituted by the temperature bits $A\theta$, $B\theta$, and the multiplexing signal $C\theta$. The memory matches an output word Z1, Z2 . . . Z8 with each address. When the range is overstepped, the bit $C'\theta$ causes all the outputs of memory 7 to go high.

The output word Z1, Z2 . . . Z8 is applied to a preselection counter 19 which receives the Tr signal.

Counter 19 also receives the clock pulses H from synchronizer 3 by means of a gate 20 which likewise receives the output signal $S\theta$. The arrival of a transfer signal Tr at a preselection counter 19 has the effect of setting the preselection counter. A preselection counter is one which is designed to count to a predetermined number and produce on output signal when this number is reached. Under the influence of the clock pulses H, the counter 19 produces a high signal at output $S\theta$ until the moment when it reaches its maximum counting capacity. The output signal then goes low, which blocks gate 20. The counter remains in this state until the arrival of the subsequent signal Tr. The number $Z1, Z2 \ldots Z8$ is coded in negative logic so that the duration of the high signal is equal to a number of clock pulses equal to the coded number.

The function of this transcoder circuit 8 is to convert the output signal from the memory of the temperature effects into a signal of fixed frequency, the sampling frequency.

By way of example, taking the clock pulse period H (FIG. 4) as unity, the frequency of the signal $\theta'o$ is $H/m$, the sampling period can be taken equal to 272 H, the high duration of signal He at 16 H, the low duration of the signal He at 256 H. All the signals delivered by synchronizer 3 are obtained by divisions of the clock frequency, and logical combinations of the signals resulting from these divisions. If the maximum capacity of the preselection counter 19 is 225, the maximum cyclic ratio $S\theta$ is 255/272. This cyclic ratio can be used directly for the control of a linear function of regulation of the motor.

In the example described, the parameters adopted are two temperatures. It should be understood that the apparatus and method can be used with any parameters available in the form of analog signals.

In particular, the number of parameters is not limited to two. Furthermore, the factors $m$ of division of the clock frequency, and $p$ of division at the level of the counters 16 and 17, can be chosen freely. Likewise, the numbers of input and output bits of the programmed memory can be arbitrarily selected.

What is claimed is:

1. Apparatus for producing a control signal for modifying the duration of an injection signal of a fuel injection system of a combustion motor comprising sensor means adapted for measuring first and second operating parameters of the motor and producing corresponding first and second analog signals respectively representative thereof, means including multiplexing means for sequentially and alternately converting each of said first and second analog signals into respective third and fourth signals each having a duration representative of the corresponding first and second analog signals, means responsive to the duration of each of said third and fourth signals for producing respective first and second groups of pulses having a number representative of the duration of the respective third and fourth signals, processing means for sequentially receiving said first and second groups of pulses representative of each said third and fourth signals and alternately producing a respective first and second coded word in response to each said first and second group of pulses, programmed memory means alternately receiving each said first and second coded words and alternately producing a respective first and second output word corresponding thereto, each said first and second output word being respectively representative of the measured first and second engine parameters and transcoder means for alternately transforming each first and second output word into a respective control signal of predetermined time duration for modifying the duration of the injection signal for the fuel injection system.

2. Apparatus as in claim 1 wherein said transcoder means produces said respective control signals at a fixed frequency.

3. Apparatus as in claim 1 wherein said processing means comprises two counter means which are respectively responsive to said first and second groups of pulses, said multiplexing means alternately and sequentially operating said two counter means in correspondence with the alternate production of the first and second groups of pulses to alternately and sequentially produce the first and second coded words.

4. Apparatus as in claim 3 wherein said two counter means of said processing means each continuously accumulates a remainder count as a respective counter means produces a coded word.

5. Apparatus as in claim 1 wherein said transcoder means includes a preselection counter means.

* * * * *